US006053454A

United States Patent [19]

Smolik et al.

[11] Patent Number: 6,053,454

[45] Date of Patent: Apr. 25, 2000

[54] MODULAR SPACECRAFT PAYLOAD SUPPORT STRUCTURE

[75] Inventors: John V. Smolik, Granada Hills; Spencer C. Ku, Rancho Palos Verdes; Andrew I. Mactavish, Hermosa Beach; Mark A. Spiwak, Redondo Beach, all of Calif.

[73] Assignee: Hughes Electronics Corporation, El Segundo, Calif.

[21] Appl. No.: 09/148,581

[22] Filed: Sep. 4, 1998

[51] Int. Cl.[7] ........ B64G 1/10

[52] U.S. Cl. ........ 244/158 R

[58] Field of Search ........ 244/158 R, 172, 244/117 R, 118.1

[56] References Cited

U.S. PATENT DOCUMENTS

| | | | |
|---|---|---|---|
| 4,395,004 | 7/1983 | Ganssle et al. | 244/158 R |
| 5,199,672 | 4/1993 | King et al. | 244/158 R |
| 5,314,146 | 5/1994 | Chicoine et al. | 244/158 R |
| 5,411,226 | 5/1995 | Jones et al. | 244/158 R |
| 5,613,653 | 3/1997 | Bombled et al. | 244/158 R |
| 5,846,767 | 12/1998 | Cappa et al. | 244/158 R |

*Primary Examiner*—J. Woodrow Eldred

*Attorney, Agent, or Firm*—Georgann S. Grunebach; M. W. Sales

[57] ABSTRACT

A modular payload support for placement in an enclosure defined by the sidewalls of a launch vehicle includes a central hub, a plurality of trusses, and a plurality of modular outer panels. Each of the trusses includes an inner edge secured to the hub and extends radially outward from the hub. Each of the trusses further includes an outer edge, and a modular outer panel is secured to each of the truss outer edges. Each modular outer panel is adapted for attachment to the vehicle sidewall, with each modular outer panel being sized to span the available distance between the truss outer edge and the vehicle sidewall. Each of the trusses is constructed of a number of layers or plies, so that the trusses may be tailored to meet strength and stiffness requirements of a contemplated application.

31 Claims, 7 Drawing Sheets

FIG. 6
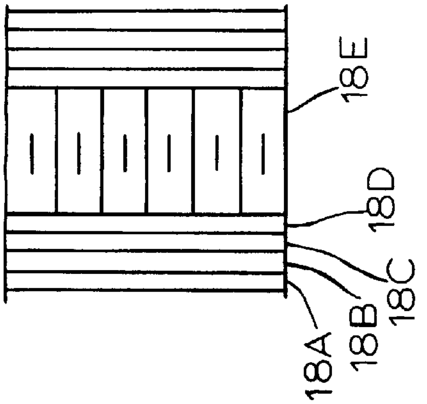
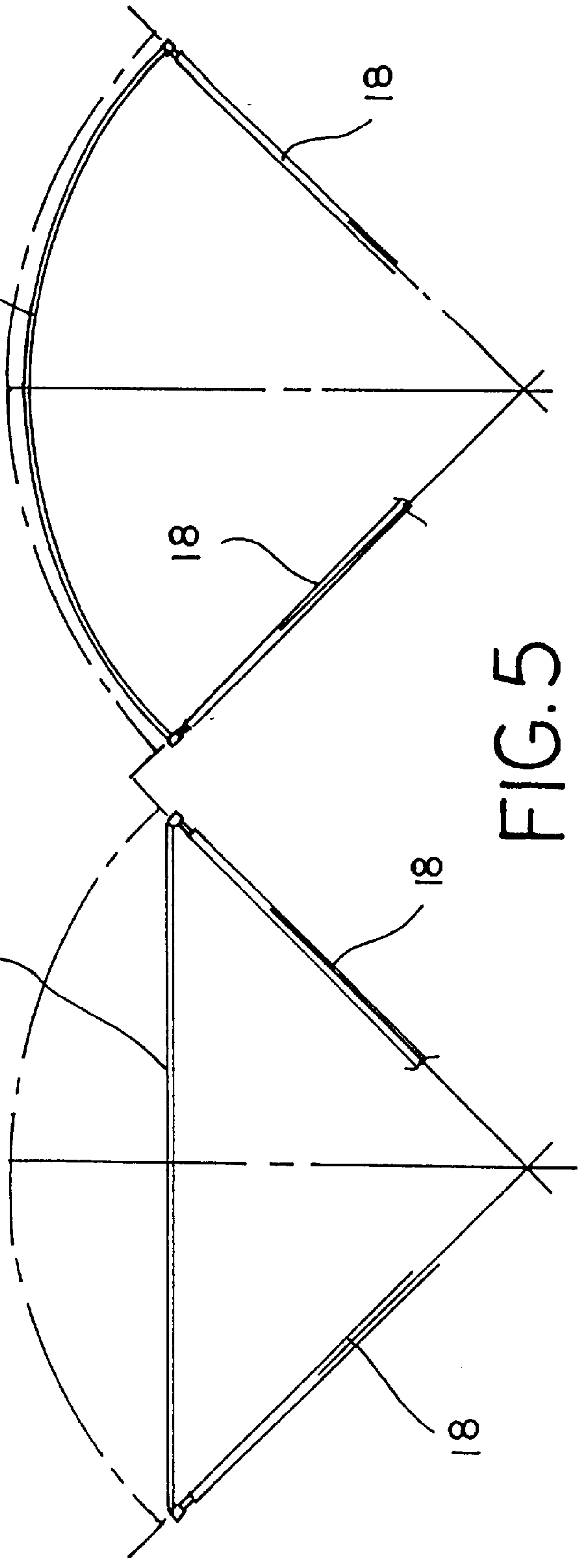
FIG. 5

MODULAR SPACECRAFT PAYLOAD SUPPORT STRUCTURE

This invention was made with Government support. The Government has certain rights in this invention.

FIELD OF THE INVENTION

The present invention relates generally to a modular pre-engineered payload support structure for use in a variety of spacecraft launch vehicles.

BACKGROUND OF THE INVENTION

The design of spacecraft payload support structures is complicated by the wide variety of launch vehicles presently contemplated or in use. For example, at least nine of the commercially available launch vehicles each have different dimensions and different load carrying capacities. Consequently, each payload support structure must be designed to accommodate different payload mounting points and different load paths.

Unfortunately, according to present practice, the payload support structures for each launch vehicle are individually designed and tested to account for the launch vehicle variations. The individual design, construction, and testing required by present practice leads to increased parts, labor and testing costs, and also leads to increased assembly time. Accordingly, there exists a need for a modular payload support structure that can be readily adapted for use in any of the major launch vehicles.

SUMMARY OF THE INVENTION

A modular spacecraft payload support structure according to the present invention can be tailored to fit a variety of different launch vehicles by attaching modular panels of varying dimensions to a central standardized frame structure. The strength and stiffness of the central frame can be modified by adding or deleting graphite plies as necessary in order to achieve the desired load carrying characteristics. The central frame thus provides a direct load path from the payload mounting points to the launch vehicle hard points.

A modular spacecraft payload support structure according to the present invention allows the load path capability to be tailored while providing low structural weight to base bending moment ratio. The modular design lessens assembly time, lowers the number of component parts, and shortens system test span. The present design is suitable for spinning or body stabilized configurations.

According to one aspect of the invention, a modular payload support for placement in an enclosure defined by the sidewalls of a launch vehicle includes a central hub, a plurality of trusses, and a plurality of modular outer panels. Each of the trusses includes an inner edge secured to the hub and extends radially outward from the hub. Each of the trusses further includes an outer edge, and a modular outer panel is secured to each of the truss outer edges. Each modular outer panel is adapted for attachment to the vehicle sidewall, with each modular outer panel being sized to span the available distance between the truss outer edge and the vehicle sidewall.

Each of the trusses is constructed of a plurality of graphite epoxy layers or plies, and each truss includes an inner leg, an outer leg, and a system of braces connecting the inner leg to the outer leg. The inner legs of the trusses cooperate to define a central post or pillar having an upper portion, a middle portion, and a lower portion. At least one of the braces from each truss is attached to the central pillar adjacent to the middle portion to strengthen and stiffen the central axis of the structure.

A plurality of graphite epoxy struts are provided in order to further strengthen the structure, with each strut spanning the distance between adjacent trusses. Preferably, an annular brace is provided which extends between the outer edges of adjacent trusses, with each annular brace having an inner arm secured to the outer edge of the truss members and an outer arm secured to the outer edge of the modular outer panel. The modular panels as are preferably of lightweight aluminum honeycomb construction, and aluminum fittings are provided in order to interconnect adjacent components.

According to another aspect of the invention, a modular payload support structure, comprises a launch vehicle having a support surface and a sidewall enclosing a payload bay, a central hub secured to the support surface, a plurality of radially extending trusses, and a plurality of modular panels. Each trusses includes an inner edge and an outer edge, with the inner edge being secured to the hub. Each of the modular panels has an inner edge secured to the outer edge of an adjacent truss, and further has an outer edge secured to the vehicle sidewall. Each panel is sized to span the distance between the truss outer edge and the vehicle sidewall.

According to yet another aspect of the invention, a modular payload support structure comprises a launch vehicle having a support surface and a sidewall, a plurality of radially disposed trusses converging to form a central pillar, and a plurality of modular panels. Each truss includes an inner edge and an outer edge, with the inner edge of each truss being secured to the inner edges of its adjacent trusses. The modular panels each have an inner edge secured to the outer edge of an adjacent truss, and are sized to span the distance between the truss outer edge and the vehicle sidewall to permit an outer edge of each panel to be secured to the vehicle sidewall. A plurality of outer annular members connect the outer edges of adjacent truss members.

BRIEF DESCRIPTION OF THE DRAWINGS

FIG. 5 is a fragmentary plan view showing two possible configurations for the spacecraft, enabling the structure to be configured as a spinner or a three axis vehicle;

FIG. 6 is a fragmentary cross-sectional view of one of the modular trusses taken generally along lines 6—6 of FIG. 1 and illustrating the multiple ply construction of the truss members;

DESCRIPTION OF THE PREFERRED EMBODIMENT

Figure 1:
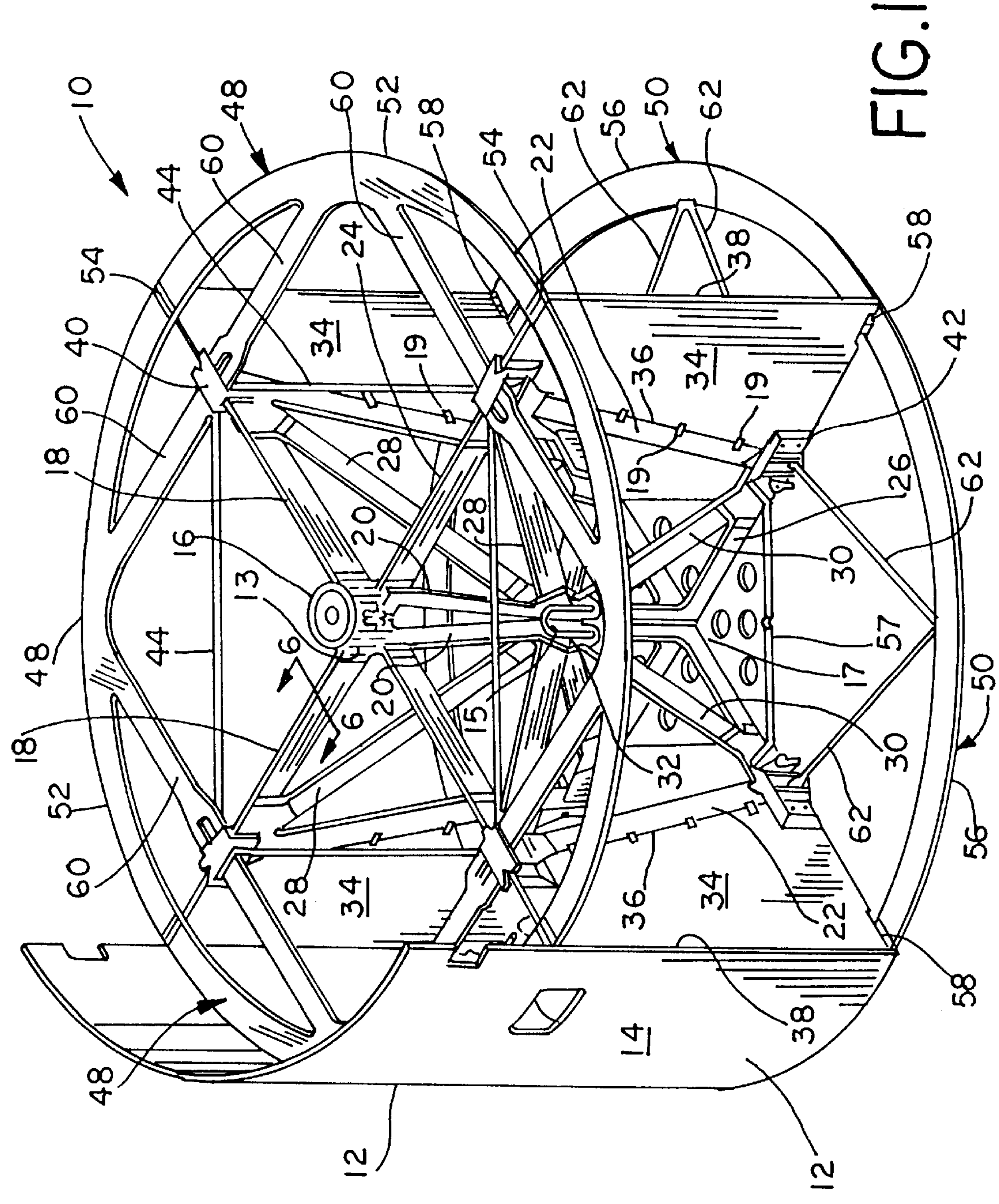
FIG. 1 is a perspective view of the modular payload support structure incorporating features of the present invention.

The embodiment described herein is not intended to limit the scope of the invention to the precise form disclosed. The embodiment has been chosen and described in order to explain the principles of the invention and its practical use in order to enable others skilled in the art to follow its teachings.

Referring now to the drawings, a modular payload support system incorporating the features of the present invention is generally referred to by the reference numeral 10. System 10 is adapted for use in a launch vehicle or spacecraft 12 having a sidewall 14. System 10 includes a central axis or hub 16 which is at the intersection of a number of identical modular frames or truss members 18. Although four truss members 18 are shown, it is contemplated that additional or fewer truss members may be employed. Further, although the illustrated truss members 18 are generally identical, minor variations may be contemplated depending on the mounting hardware required for certain payload elements (not shown) or other variations as dictated by launch specific constraints.

Each truss member 18 includes an inner edge 20, an outer edge 22, and interconnecting top and bottom edges 24, 26, respectively. Each truss member 18 further includes a pair of inclined braces 28, 30, which generally converge at the midpoint 32 of the inner edges 20 of the truss members 18. Although two inclined braces are shown, additional or fewer braces may be employed depending on the load bearing capacity of the envisioned finished system 10. Hub 16 may include a top, middle, and bottom mounting brackets 13, 15, and 17, respectively, or other suitable fittings having a multitude of attachment points to permit the attachment of the truss members 18 to each other. Preferably, each of the truss members is constructed of a graphite epoxy material. The truss members consist of graphite epoxy facesheets or skins bonded to an aluminum honeycomb care. These graphite facesheets are constructed of multiple layers of graphite, with the fiber direction for each layer being strategically chosen to provide the necessary strength and stiffness for the member as is well known in the art.

Figure 3:
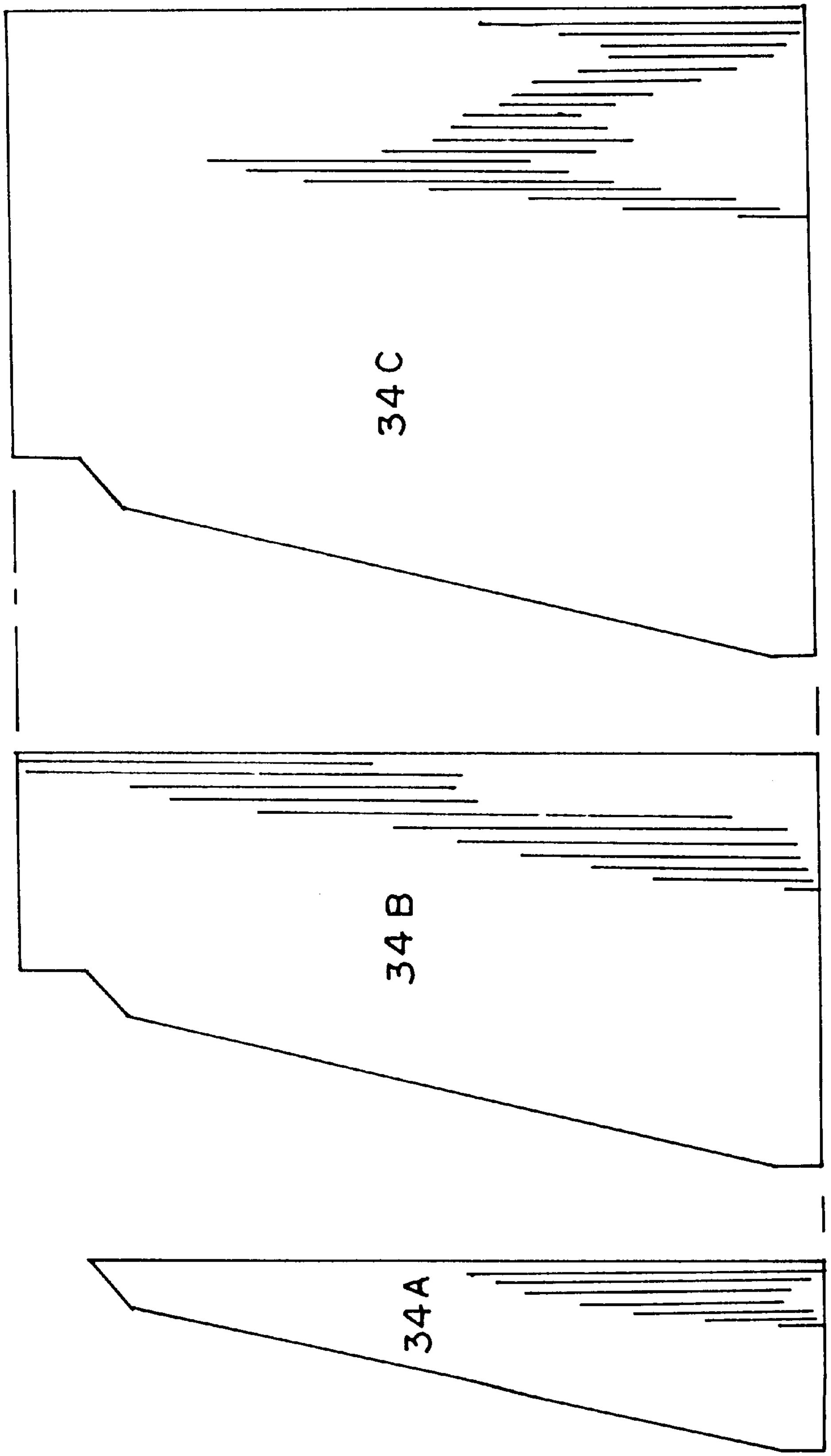
FIG. 3 is an enlarged elevational view of three possible configurations for the modular outer panels.
Figure 4:
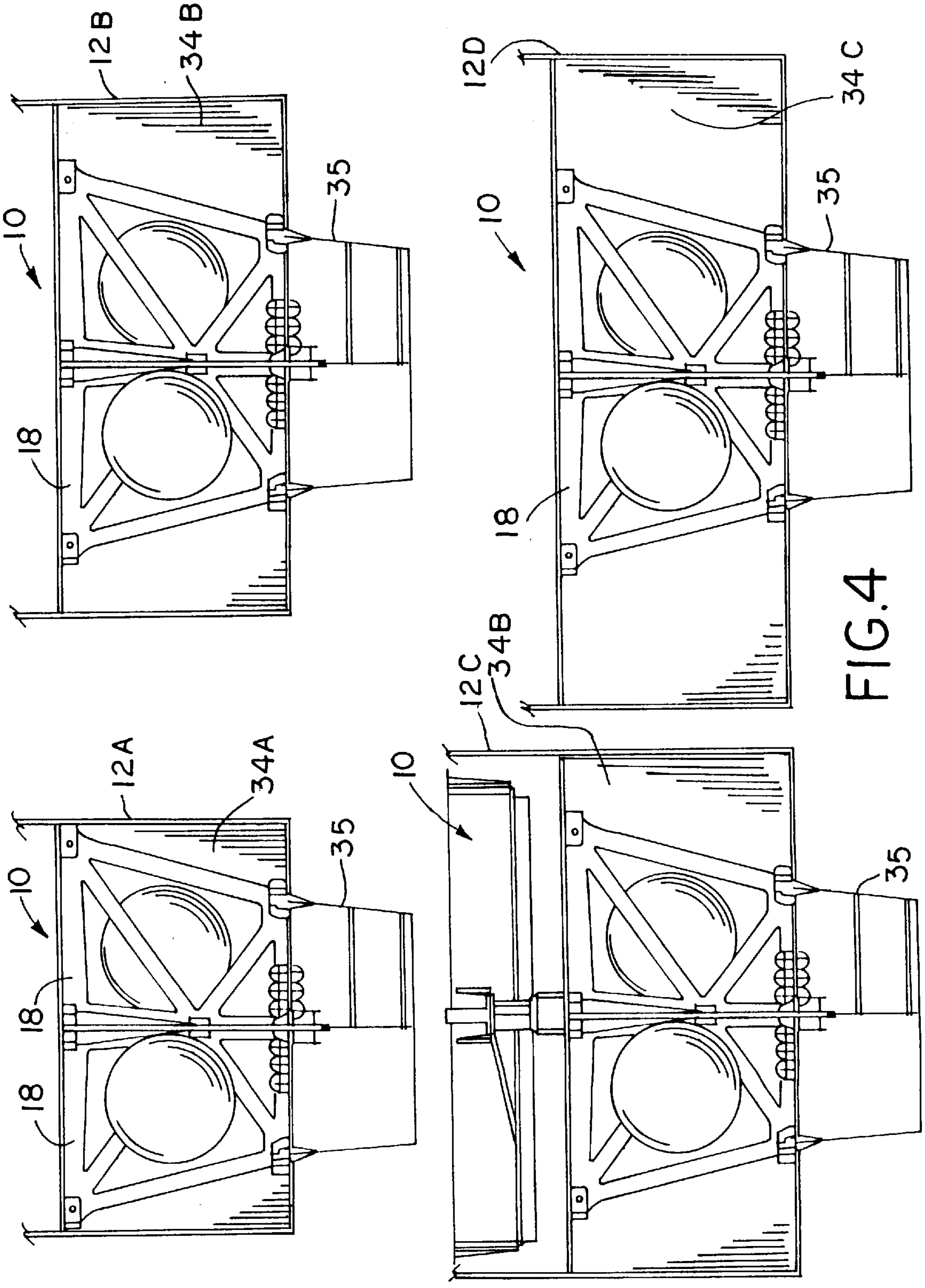
FIG. 4 is an elevational view of the modular payload support frame of the present invention shown installed on a variety of well known launch vehicles.

A modular outer panel 34 includes an inner edge 36 and an outer edge 38. The inner edge 36 of each outer panel 34 is secured to the outer edge 22 of an adjacent truss member 18 using a plurality of mounting bracket assemblies 19 such as bolts, screws, adhesives or other suitable fasteners or fastener/mounting bracket assemblies. Each outer panel 34 is preferably constructed of honeycomb aluminum or a similar material having a high strength to weight ratio. The outer edge 38 of each outer panel 34 is secured to the sidewall 14 of the spacecraft 12, using screws, bolts, or other suitable fasteners (not shown). As shown in FIG. 3, the outer panels 34 may come in a variety of sizes, with three such possible sizes being illustrated as panels 34*a*, 34*b*, and 34*c*. The size of the panel depends on the size of the spacecraft 12, with four different configurations being illustrated in FIG. 4, utilizing three different sizes for the outer panels 34. Each spacecraft 12 includes various supporting surfaces or components 35. To illustrate further, the spacecraft 12*a* to the upper left of FIG. 4 uses panel 34*a*, the spacecraft 12*b* and 12*c* shown in the upper right and lower left, respectively, uses panel 34*b*, while the spacecraft 12*d* shown to the lower right of FIG. 4 uses panel 34*c*. Other configurations may of course be contemplated, each of which may require a different size panel 34.

The outer edges 22 of each truss 18 includes an upper and lower mounting bracket 40, 42. The mounting brackets may be constructed of aluminum or other suitable lightweight material. A series of upper struts 44 extend between adjacent trusses 18 for attachment to the mounting brackets 40. Upper and lower annular braces 48, 50 also extend between adjacent trusses 18. Each upper annular brace 48 includes an outer section 52 which extends between the upper portion of outer edge 38 of adjacent panels 34, and which is secured thereto by an aluminum mounting bracket 54. Each lower brace 50 includes an outer section 56 which extends between the lower portion of the outer edge 38 of adjacent panels 34, and is secured thereto by an aluminum mounting bracket 58. Upper and lower annular braces 48, 50 may be constructed of aluminum honeycomb, graphite composite, or any other suitable lightweight material. Each upper annular brace 48 includes a pair of struts 60 which attach to the mounting brackets 40 of adjacent truss members 18. A pair of struts 62 extend form the outer section 56 of each lower annular brace 50 and attach to the lower bracket 42 of the adjacent truss members 18. A lower platform or gusset plate 57 extends between the bottom edge 26 of adjacent truss members 18. Struts 44 and 62 are preferably of graphite epoxy construction, although other suitable lightweight materials having favorable strength and stiffness properties may be substituted.

Figure 2:
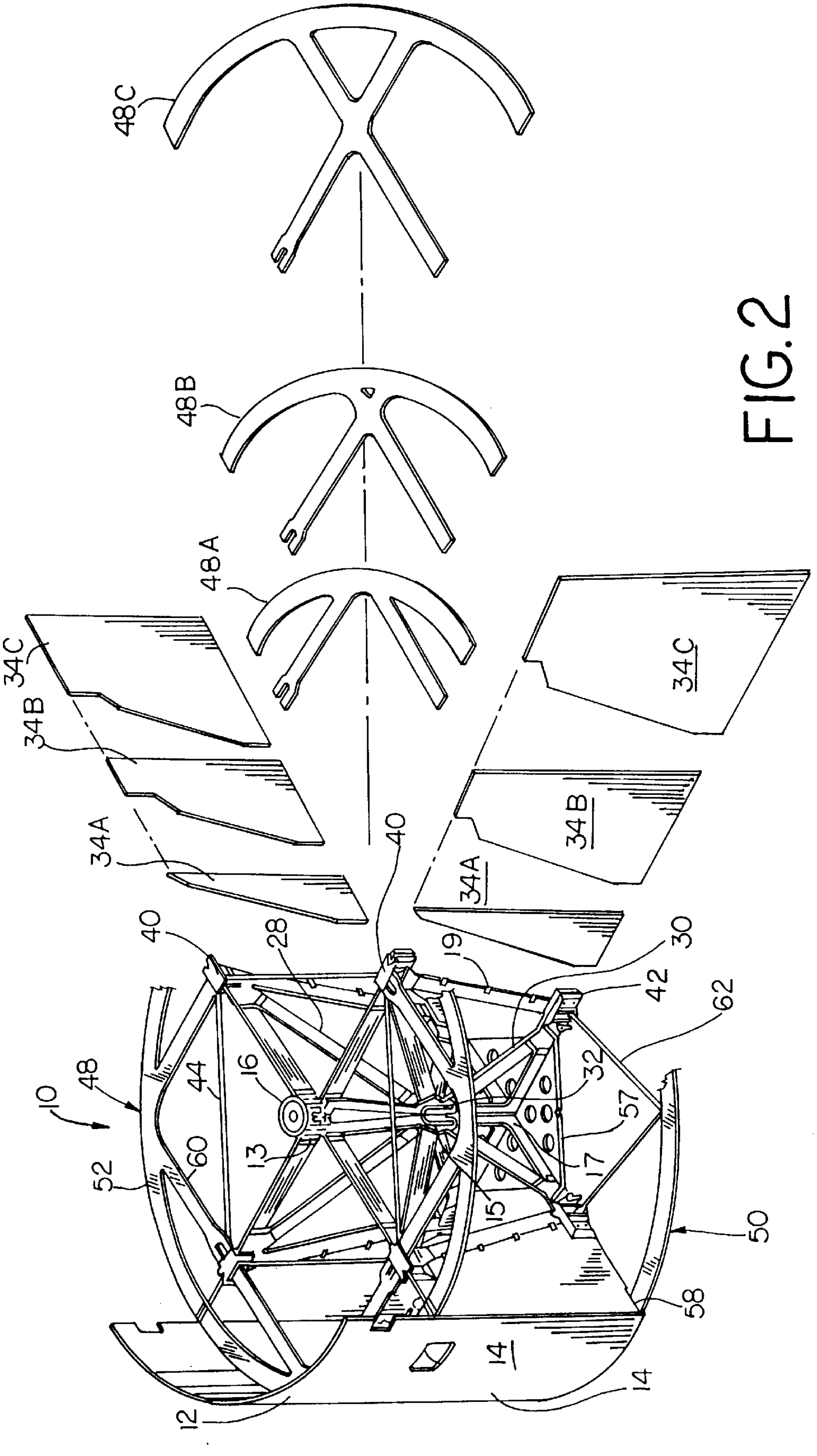
FIG. 2 is a partially exploded view in perspective similar to FIG. 1 but illustrating a variety of modular components which may be interchanged and substituted depending on the dimensions of the launch vehicle.

As shown in FIG. 2, the outer annular braces 48, 50 may come in a variety of sizes, with three such possible sizes for the upper annular braces being illustrated as braces 48*a*, 48*b*, and 48*c*. As with the substitution of the panels 34 using the different sizes 34*a*, 34*b*, and 34*c*, the braces 48*a–c* are similarly interchanged depending on the dimensions of the spacecraft 12. The lower annular braces 50 may be of correspondingly larger sizes, progressing in a manner similar to that shown for the upper annular braces 48.

Figure 7:
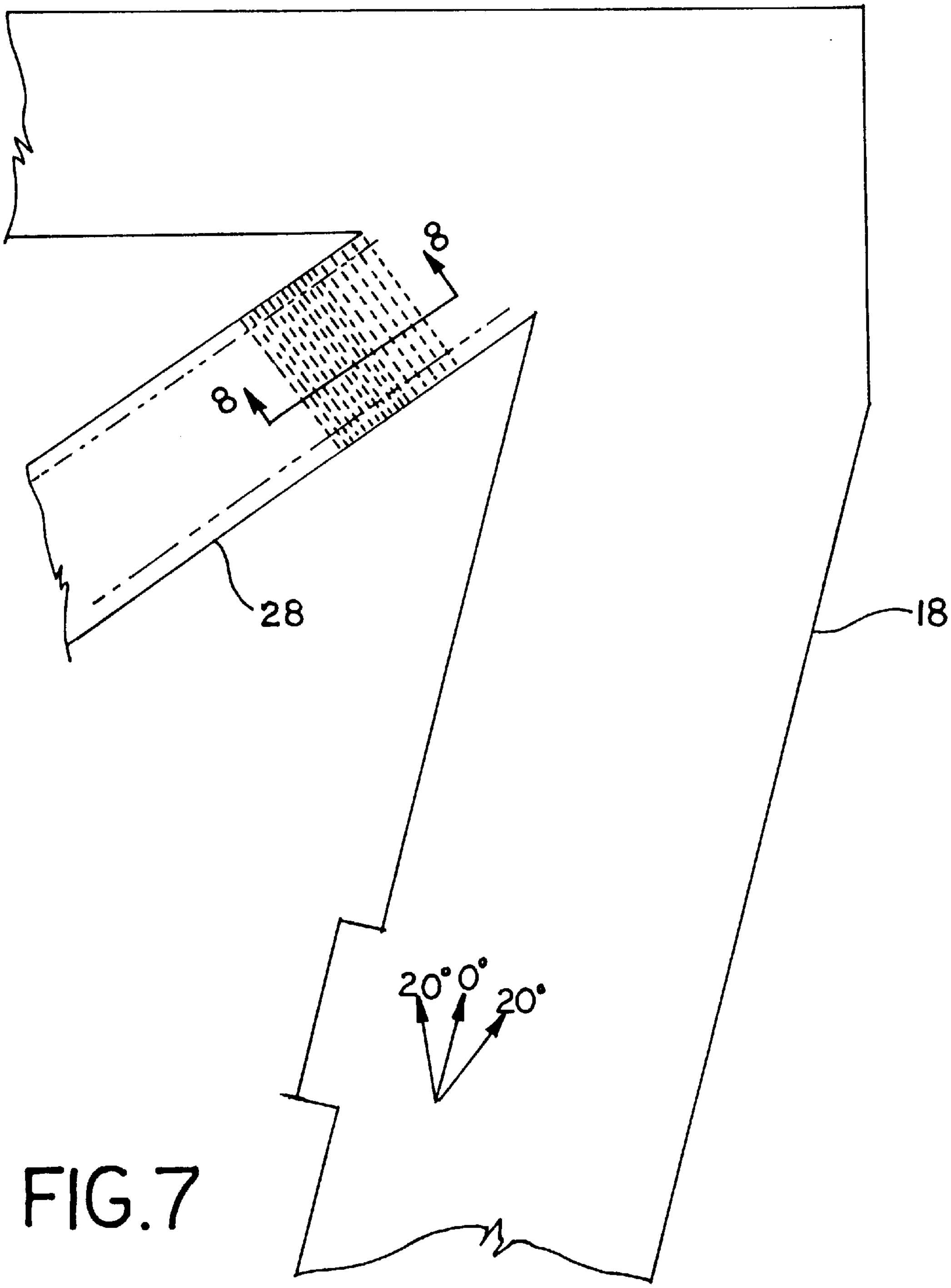
FIG. 7 is an enlarged fragmentary elevational view of a corner portion of one of the modular trusses.
Figure 8:
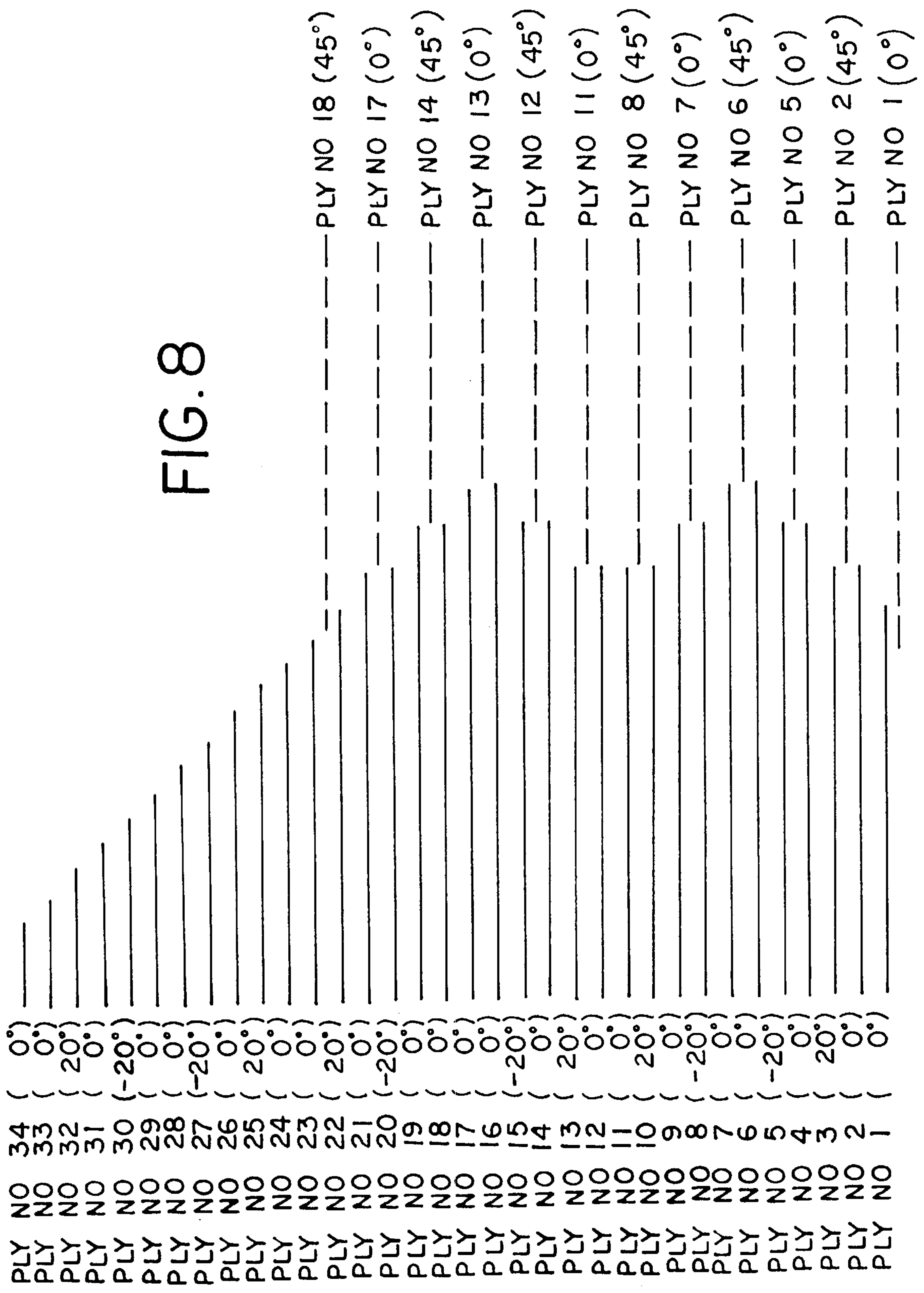
FIG. 8 is a graphical representation, taken along lines 8—8 of FIG. 7, illustrating the number and the orientation of the graphite plies at one region of the modular truss.

Referring now to FIG. 6, one of the truss members 18 is shown in an enlarged cross-section. The truss member 18 consists of two facesheets separated by an aluminum honeycomb core 18*e*. Each facesheet includes a plurality of layers or plies, with four plies 18*a* through 18*d* being shown. Additional or fewer plies may be employed, depending on the load carrying requirements of the contemplated application. For example, the cross-sectional region represented graphically in FIG. 8, which is taken at the designated portion of FIG. 7 through the one facesheet of the inclined brace 28, illustrates the use of thirty four such plies, each of which is oriented either parallel to or angled relative to the longitudinal dimension of the inclined brace 28. Preferably, the plies are joined by an adhesive, which permits the plies to respond to loads in true composite fashion. Each ply of graphite consists of graphite fibers embedded in a graphite epoxy adhesive, such as an adhesive manufactured by Hexcell-Fiberite and sold under the brand name "934". During the fabrication process the plies are consolidated or stacked and then cured under elevated temperature and pressure such that the individual layers of the resulting facesheet act in unison. Alternatively, the plies may be joined by a plurality of fasteners (not shown).

In operation, the modular payload support system 10 of the present invention is assembled by first constructing the truss members 18. The number of plies per facesheet 18*a*, 18*b*, 18*c*, 18*d*, . . . 18*n*, are chosen to meet the strength and stiffness requirements of the desired application. Once each of the trusses 18 have been assembled according to the desired criteria, a number of trusses are positioned as shown in FIG. 1 with their inner edges 20 adjacent each other, and the inner edges are then joined together using the brackets 13, 15, 17 to form the central hub 16.

The struts 44 are attached between the brackets 40, and the upper and lower annular braces are also attached to the brackets 40, 42. Struts 62 are secured, as are the gusset plates 57 are secured between the adjacent trusses 18. The correct size for the outer panels 34 (e.g., panels 34*a*, 34*b*, or 34*c*) are then chosen and attached using brackets 40, 42, 54 and 58, as well as bracket assemblies 19. The sidewall 14 of spacecraft 12 can then be attached using conventional methods. Alternatively, in applications such as that shown to the left of FIG. 5, the annular braces 48, 50 may be straight rather than curvilinear, or a portion of the sidewall 14, such a sidewall 14*a* shown to the left of FIG. 5, may also serve as the upper and lower braces 48, 50.

It will be understood that the above description does not limit the invention to the precise form disclosed. It is contemplated that various modifications and substitutions can be made without departing from the scope of the following claims.

What is claimed:

1. A modular payload support for placement in an enclosure defined by the sidewalls of a launch vehicle, comprising:

a central hub;

a plurality of trusses, each of the trusses having an inner edge secured to the hub and extending radially outward therefrom, each of the trusses further having an outer edge;

a modular outer panel secured to each of the truss outer edges, each modular outer panel being adapted for attachment to the vehicle sidewall, each modular outer panel further being sized to span the distance between the truss outer edge and the vehicle sidewall.

2. The device of claim 1, wherein each of the trusses includes a plurality of removable plies.

3. The device of claim 1, wherein each of the trusses includes an inner leg, and outer leg, and a brace connecting the inner leg to the outer leg.

4. The device of claim 3, including a central pillar defined in part by the inner legs of the trusses and having an upper portion, a middle portion, and a lower portion, one of the braces from each truss being attached to the central pillar adjacent the middle portion.

5. The device of claim 1, wherein each truss outer edge is joined to the outer edges of its adjacent trusses by a strut.

6. The device of claim 1, including an annular brace extending between the outer edges of adjacent trusses.

7. The device of claim 1, including a gusset plate for stiffening the connection between the truss inner edges and the hub.

8. The device of claim 1, wherein each of the modular panels is of aluminum honeycomb construction.

9. The device of claim 1, wherein the trusses are joined to the central hub by aluminum fittings.

10. The device of claim 5, wherein each strut is attached to its adjacent trusses by an aluminum fitting.

11. The device of claim 5, wherein each strut is of graphite epoxy construction.

12. The device of claim 6, wherein each annular brace is of aluminum honeycomb construction.

13. The device of claim 1, including an annular brace connected between adjacent trusses and having an inner arm attached to each truss adjacent the truss outer edge and further having an outer arm attached to an outer edge of each outer panel.

14. A modular payload support structure, comprising:

a launch vehicle having a support surface and a sidewall enclosing a payload bay;

a central hub secured to the support surface;

a plurality of radially extending trusses, each truss having an inner edge and an outer edge, the inner edge being secured to the hub; and a plurality of modular panels, each panel having an inner edge secured to the outer edge of an adjacent truss, each panel further having an outer edge secured to the vehicle sidewall, each panel further being sized to span the distance between the truss outer edge and the vehicle sidewall.

15. The device of claim 14, wherein each of the trusses includes a plurality of removable plies.

16. The device of claim 14, wherein each of the trusses includes an inner leg, and outer leg, and a brace connecting the inner leg to the outer leg.

17. The device of claim 16, including a central pillar defined in part by the inner legs of the trusses and having an upper portion, a middle portion, and a lower portion, one of the braces from each truss being attached to the central pillar adjacent the middle portion.

18. The device of claim 14, wherein each truss outer edge is joined to the outer edges of its adjacent trusses by a strut.

19. The device of claim 14, including an annular brace extending between the outer edges of adjacent trusses.

20. The device of claim 14, including a gusset plate for stiffening the connection between the truss inner edges and the hub.

21. The device of claim 14, wherein each of the modular panels is of aluminum honeycomb construction.

22. The device of claim 14, wherein the trusses are joined to the central hub by aluminum fittings.

23. The device of claim 18, wherein each strut is attached to its adjacent trusses by an aluminum fitting.

24. The device of claim 18, wherein each strut is of graphite epoxy construction.

25. The device of claim 19, wherein each annular brace is of aluminum honeycomb construction.

26. The device of claim 14, including an annular brace connected between adjacent trusses and having an inner arm attached to each truss adjacent the truss outer edge and further having an outer arm attached to an outer edge of each modular panel.

27. A modular payload support structure, comprising:

a launch vehicle having a support surface and a sidewall;

a plurality of radially disposed trusses converging to form a central pillar, each truss having an inner edge and an outer edge, the inner edge of each truss being secured to the inner edges of its adjacent trusses;

a plurality of modular panels, each panel having an inner edge secured to the outer edge of an adjacent truss and having an outer edge, each panel further being sized to span the distance between the truss outer edge and the vehicle sidewall to permit the panel outer edge to be secured to the vehicle sidewall; and a plurality of support members connecting the outer edges of adjacent truss members.

28. The device of claim 27, wherein each of the trusses includes a plurality of graphite epoxy plies.

29. The device of claim 27, wherein each of the trusses includes an inner leg, and outer leg, and a brace connecting the inner leg to the outer leg.

30. The device of claim 27, wherein the central pillar includes an upper portion, a middle portion, and a lower portion, one of the braces from each truss being attached to the central pillar adjacent the middle portion.

31. The device of claim 27, wherein the support members include an inner arm attached to each truss adjacent the truss outer edge and further include an outer arm attached to an outer edge of each modular panel.

* * * * *